(12) United States Patent
Knapp

(10) Patent No.: US 9,040,914 B2
(45) Date of Patent: *May 26, 2015

(54) OPTICAL DEMULTIPLEXING SYSTEM

(71) Applicant: Newport Corporation, Irvine, CA (US)

(72) Inventor: Jamie Knapp, Mendon, MA (US)

(73) Assignee: NEWPORT CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,610

(22) Filed: Dec. 13, 2013

(65) Prior Publication Data

US 2015/0115140 A1 Apr. 30, 2015

Related U.S. Application Data

(63) Continuation of application No. 13/174,516, filed on Jun. 30, 2011, now Pat. No. 8,633,440.

(60) Provisional application No. 61/360,560, filed on Jul. 1, 2010.

(51) Int. Cl.
*G01J 5/00* (2006.01)
*G01J 3/36* (2006.01)
*H04J 14/02* (2006.01)
(Continued)

(52) U.S. Cl.
CPC . *G01J 3/36* (2013.01); *H04J 14/02* (2013.01); *G02B 6/2938* (2013.01); *G02B 27/1006* (2013.01)

(58) Field of Classification Search
CPC .................................. G01J 3/36; G02B 6/2938

USPC ........................................................ 250/338.1
See application file for complete search history.

(56) References Cited

U.S. PATENT DOCUMENTS 2,267,961 A * 12/1941 Tillyer et al. ................. 356/124
4,631,417 A * 12/1986 Brilman ........................ 348/294
4,740,951 A    4/1988 Lizet et al.
(Continued)

FOREIGN PATENT DOCUMENTS

CN        2518092 Y      10/2002
CN        1862296 A      11/2006
(Continued)

OTHER PUBLICATIONS

International Preliminary Report on Patentability dated: Jan. 17, 2013 in International Application No. PCT/US2011/042705 filed: Jun. 20, 2011 and published as: WO/2012/003395 on: Jan. 5, 2012.
(Continued)

*Primary Examiner* — David Porta
*Assistant Examiner* — Jeremy S Valentiner
(74) *Attorney, Agent, or Firm* — Anderson IP, Inc.

(57) ABSTRACT

Demultiplexing systems and methods are discussed which may be small and accurate without moving parts. In some cases, demultiplexing embodiments may include optical filter cavities that include filter baffles and support baffles which may be configured to minimize stray light signal detection and crosstalk. Some of the demultiplexing assembly embodiments may also be configured to efficiently detect U.V. light signals and at least partially compensate for variations in detector responsivity as a function of light signal wavelength.

29 Claims, 13 Drawing Sheets

(51) Int. Cl.
*G02B 6/293* (2006.01)
*G02B 27/10* (2006.01)

(56) References Cited

U.S. PATENT DOCUMENTS

| | | | |
|---|---|---|---|
| 5,724,401 A * | 3/1998 | Kurtz et al. | 378/171 |
| 5,905,827 A * | 5/1999 | Naganuma et al. | 385/31 |
| 5,995,235 A | 11/1999 | Sui et al. | |
| 6,011,885 A | 1/2000 | Dempewolf et al. | |
| 6,147,806 A | 11/2000 | Park et al. | |
| 6,373,606 B1 * | 4/2002 | Nakama | 398/87 |
| 6,486,984 B1 * | 11/2002 | Baney et al. | 398/212 |
| 6,496,616 B2 | 12/2002 | Frish et al. | |
| 6,563,976 B1 | 5/2003 | Grann et al. | |
| 6,636,658 B2 | 10/2003 | Goodman | |
| 6,782,203 B2 | 8/2004 | Lin et al. | |
| 7,194,166 B1 | 3/2007 | Gunn, III | |
| 7,412,170 B1 | 8/2008 | Louderback et al. | |
| 7,532,401 B2 | 5/2009 | Hwang et al. | |
| 8,633,440 B2 | 1/2014 | Knapp | |
| 2002/0150329 A1 | 10/2002 | Ahn et al. | |
| 2002/0181046 A1 * | 12/2002 | Jeong | 359/124 |
| 2003/0205673 A1 | 11/2003 | Williams | |
| 2003/0206688 A1 * | 11/2003 | Hollars et al. | 385/24 |
| 2003/0209650 A1 * | 11/2003 | Boubal et al. | 250/208.2 |
| 2005/0185179 A1 * | 8/2005 | Wang | 356/328 |
| 2005/0213994 A1 * | 9/2005 | Dudek et al. | 398/202 |
| 2007/0098028 A1 | 5/2007 | Alcock et al. | |
| 2012/0001083 A1 | 1/2012 | Knapp | |

FOREIGN PATENT DOCUMENTS

| | | |
|---|---|---|
| CN | 1865922 A | 11/2006 |
| CN | 201464352 U | 5/2010 |
| EP | 1109342 | 6/2001 |
| EP | 1432150 | 6/2004 |
| JP | 61-251724 | 11/1986 |
| JP | 10-232164 | 9/1998 |
| JP | 2004-144678 | 5/2004 |
| JP | 2006-518459 | 8/2006 |
| WO | WO 2012/003395 | 1/2012 |

OTHER PUBLICATIONS

International Search Report and Written Opinion dated: Feb. 20, 2012 in International Application No. PCT/US2011/042705 filed: Jun. 20, 2011 and published as: WO/2012/003395 on: Jan. 5, 2012.
Office Action dated: Jun. 5, 2013 in U.S. Appl. No. 13/174,516, filed Jun. 30, 2011, published as: 2012/0001083 on: Jan. 5, 2012 and issued as: 8,633,440 on: Jan. 21, 2014.
Office Action dated: Sep. 27, 2013 in U.S. Appl. No. 13/174,516, filed Jun. 30, 2011, published as: 2012/0001083 on: Jan. 5, 2012 and issued as: 8,633,440 on: Jan. 21, 2014.
Extended European Search dated: Sep. 16, 2014 in European Application No. EP 11801454 filed: Jun. 30, 2011 based on International Application No. PCT/US2011/042705 filed: Jun. 30, 2011 and published as: WO/2012/003395 on Jan. 5, 2012.
1/3.6 inch 1.25 million effective pixel digital still camera CCD type commercialized, Sony Japan Press release [online], Apr. 8, 1999, internet: http://www.sony.co.jp/Sonyinfo/News/Press_Archive/199904/99-043/ (with English language machine-translation of Japanese document).

* cited by examiner

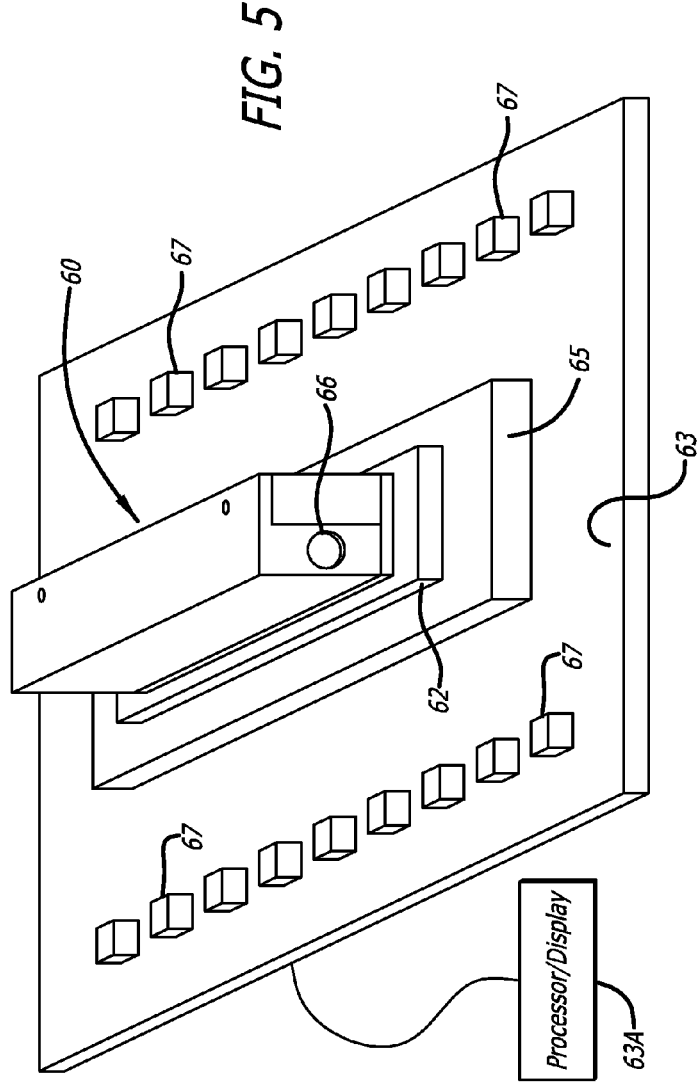
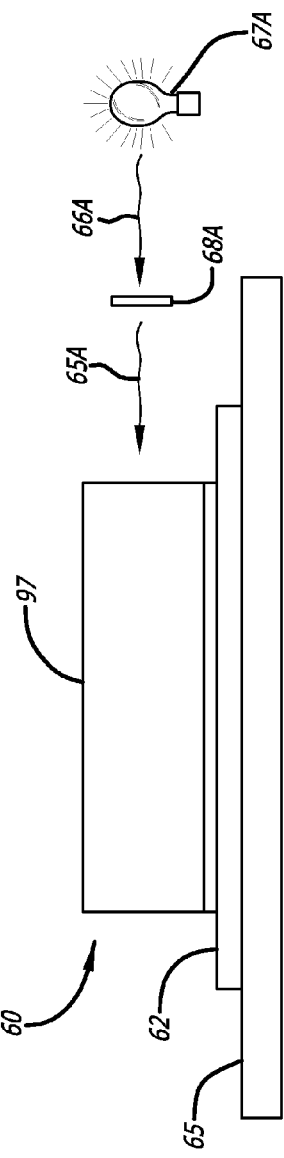
FIG. 5
FIG. 6

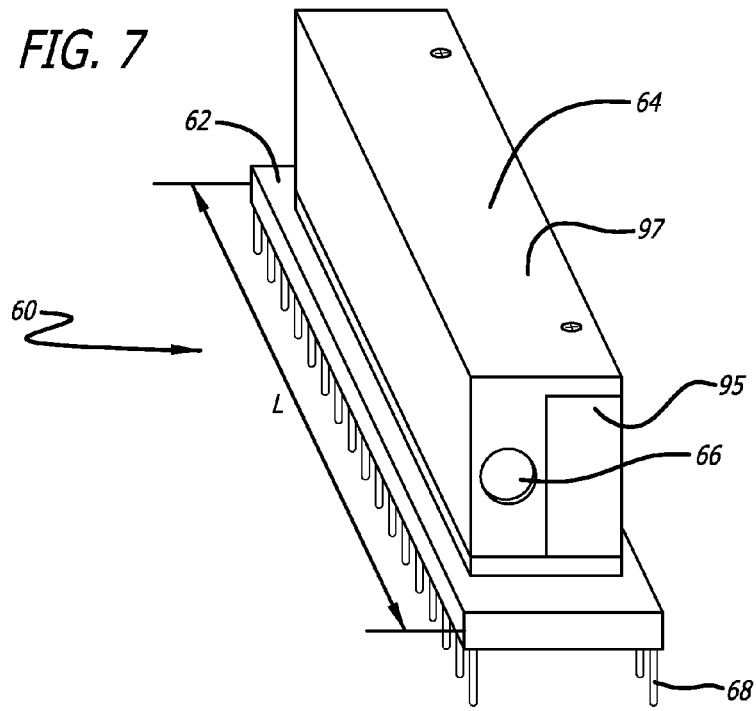
FIG. 7
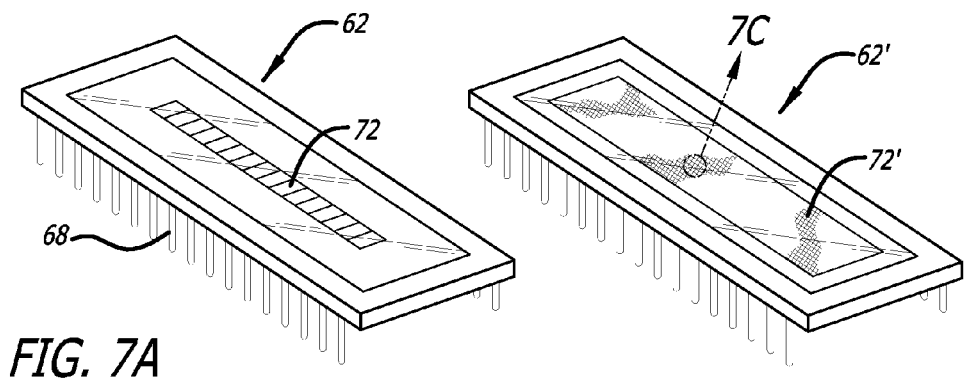
FIG. 7A
FIG. 7B
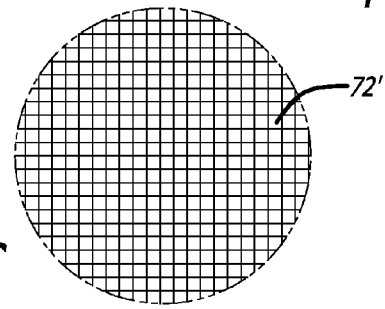
FIG. 7C

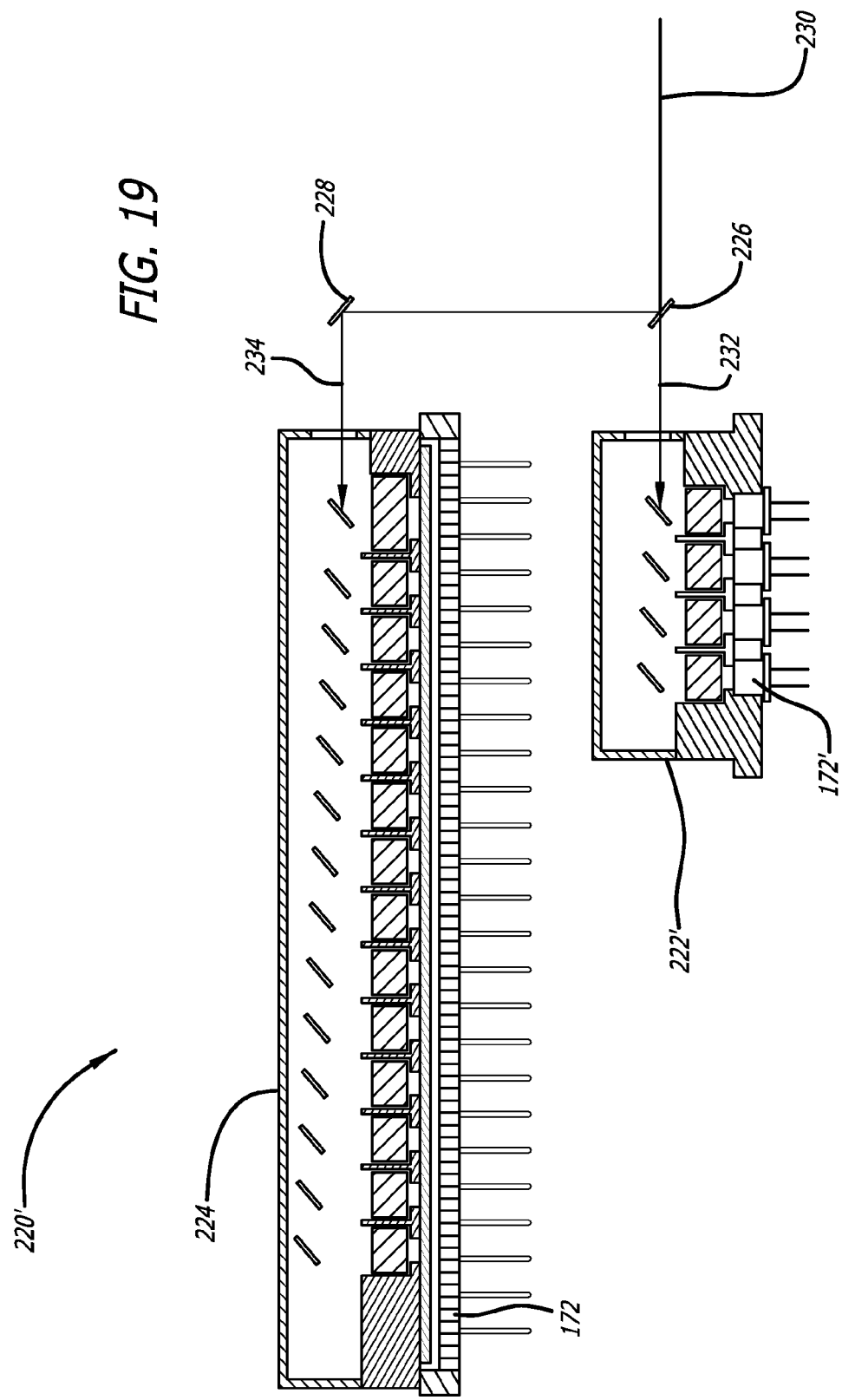

OPTICAL DEMULTIPLEXING SYSTEM

RELATED APPLICATIONS

This patent application is a continuation and claims the benefit of U.S. patent application Ser. No. 13/174,516, filed Jun. 30, 2011, entitled OPTICAL DEMULTIPLEXING SYSTEM, naming Jamie Knapp as inventor, which claims the benefit of U.S. provisional patent application Ser. No. 61/360,560 filed on Jul. 1, 2010, entitled "Miniaturized Broad Spectrum Linear Array Based Optical Demultiplexing System", naming Jamie Knapp as inventor, which are both incorporated by reference herein in their entirety.

BACKGROUND

Optical filters are used in a variety of applications. For example, these devices are commonly used in a multitude of instrumentation applications, including biomedical clinical chemistry analyzers, color-sorting instrumentation, atomic absorption spectroscopy, etc. Generally, within the instruments for these types of applications, optical filters may be positioned proximate to an optical detector and used to narrow the spectral range or bandwidth of an optical signal incident on an optical detector. Exemplary optical detectors include photovoltaic sensors, photoconductive sensors, photomultipliers and the like. In some cases, multiple optical filters may be used to sequentially segment a broad spectrum optical signal into discreet narrow wavelength optical signals.

FIG. 1 shows an optical system 1 which includes an optical filter wheel 3 configured to support multiple optical filters 5. Exemplary optical filters 5 may include bandpass filters wherein each individual filter 5 supported by the filter wheel 3 may be configured to transmit a predetermined wavelength range or band of light. The optical filter wheel embodiment 3 is configured to rotate about its axis 7, thus allowing selective positioning of each optical filter disposed on the wheel. The wheel may be selectively positioned to put a desired optical filter in a location in which the optical filter is configured to transmit light of a narrow spectral range therethrough to an optical detector 9. As a result, a broad spectral optical signal 11 may be sequentially reconfigured to a plurality of narrow spectral signals 13 corresponding to each of the optical filters 5. While these optical filter wheel-based spectral analysis device configurations have proven useful, a number of shortcomings have been identified. For example, the measurement process using a wheel based system as shown in FIG. 1 tends to be a labor intensive, time consuming process due to the need to mechanically rotate the filter wheel 3. In addition, such filter wheel based systems tend to be physically large devices, be electro-mechanically complex, offer limited longevity, and be expensive to purchase and maintain.

Various other optical demultiplexing configurations have also been developed. As shown in FIG. 2, some demultiplexing systems 19 direct incident light 21 to a planar dichroic beam splitter 23A which splits this light into two spectral signals. The reflected spectral signal is directed through an optical filter 25 and ultimately to a sensor 27. The transmitted spectral signal is transmitted through the dichroic beam splitter 23A to a subsequent dichroic beam splitter 23B which similarly repeats a spectral division of the incident light directing a portion of the signal to a detector while transmitting a portion of the incident light to subsequent dichroic beam splitters. The various dichroic beam splitters 23 may be configured to reflect a discreet spectral potion of the incident signal. Each dichroic beam splitter 23/bandpass filter 25 pair may be referred to as a "channel". Each channel may have a dedicated optical sensor or photo sensor 27 which may include a photodiode, a photomultiplier tube (PMT), or the like, which is used to analyze the incident light having a discreet wavelength or spectral band as determined by the dichroic beam splitter 23 and bandpass filter 25.

For the embodiment shown, the entire unit may be contained within a housing 29. In this example, the device includes 6 wavelength channels, but the number of channels may be dependent upon the instrument's particular application. While these systems offer some advantages over the filter wheel systems described above, a number of shortcomings have been identified. For example, optical cross-talk between neighboring channels of dichroic beam splitter 23/bandpass filter 25 pairs may be problematic. This phenomenon may significantly reduce precision of the device and may also introduce measurement error. To reduce or minimize this deleterious effect, channels of such embodiments are often physically spaced far away from each other. Unfortunately, this type of physical spacing along with the common use of large dedicated photo-sensors for this type of embodiment (typical 0.5 inch diameter silicon photodiodes are often used), results in a device configuration that is large (typically 6 inches to 18 inches in length), heavy, and costly. In addition, the long length of these devices may reduce the accuracy of light imaging onto each sensor 27 due to divergence/convergence of the incident light. Minor vibrations of this device might also affect this imaging accuracy. The results may be poor performance, including unstable signal drift, excessive noise and crosstalk in some cases.

In contrast to an optical filter-filter based system, numerous demultiplexing configurations which use an optical grating in lieu of optical filters have been developed. These systems utilize light reflected from a diffraction grating to either discreet photodiodes, or alternatively, a compact linear diode array. While systems based on optical gratings offer some advantages over filter-based systems, a number of shortcomings have been identified. For example, cost is a major shortcoming for a grating based configuration. Expensive high quality gratings tend to work well in most applications, however, for applications requiring the lowest possible cost and simplicity, less expensive gratings tend to be of limited quality. In such cases, grating-to-grating repeatability may be poor and signal-to-noise and optical density (OD) may be less than ideal. For example, some single-grating demultiplexing systems may be limited to about 2.5 OD. Other shortcomings may include high sensitivity to optical alignment, mechanical complexity, and a high sensitivity to operating temperatures.

With regard to optical detection in the wavelength range of 330 nm-1200 nm, bandpass filters are typically manufactured with a cost-effective laminated construction, consisting of absorptive color glasses or dyes, along with transparent glasses having deposited onto them various multilayer optical interference coatings. Standard 10 mm diameter optical filters of this type have good optical performance (typically >70% transmission) and cost about $15 each. For some biomedical and measurement/control applications though, optical detection in the shorter ultraviolet (U.V.) wavelength band, for example, in an optical band having a wavelength of about 230 nm to about 320 nm, may be desired. In this U.V. light wavelength range, such standard low-cost laminated optical filters may not be suitable due to optical absorption by the laminating epoxies and the lack of color glasses and dyes within this wavelength range. Rather, such filters for use in the ultraviolet spectrum are typically produced with air-gap metal-dielectric-metal (MDM) type designs. Such MDM filters are typically free from optically absorbing epoxies and, as such, offer improved lifetimes and performance over epoxy-based designs when exposed to ultraviolet light.

FIG. 3 shows the cross-section of an ultraviolet MDM type optical bandpass filter embodiment. As shown, the MDM filter device 33 includes a housing 35 to support fused silica substrates 37. An optical coating 39, usually including alternating layers of cryolite and aluminum, may be applied to the substrates 37 and may serve to define the optical filter's pass band (e.g. having a center-wavelength within the ultraviolet light wavelength region of about 200 nm to about 320 nm and a half bandwidth of nominally 8 nm to about 12 nm). The coating 39 may also serve to reject all out-of-band light up to at least about 1200 nm at a level of typically 4 OD. A hermetic seal 41 may be used to protect the environmentally sensitive coating 39, since the coating 39 is typically water soluble. During use, a failure of the hermetic seal 41 will generally lead to rapid degradation of the optical coating 39 and eventual field failure of the MDM filter device 33. Some of the disadvantages of filters of this type is that they tend to be large (typically no smaller than 0.5 inch diameter), thick (about 5 mm nominal) and they are also costly (about $200 each in some cases).

FIG. 4 is a graphical representation showing a net optical filter/detector responsivity in Amps per Watt (A/W) in the aforementioned ultraviolet (UV) light wavelength range of about 200 nm to about 320 nm for a typical optical filter/detector embodiment. For illustrative purposes, FIG. 4 shows the performance of a 270 nm MDM filter when matched with a standard silicon (Si) photodiode optical detector. In this wavelength range, typical UV-enhanced silicon photodiodes may have a responsivity of about 0.08 A/W. As illustrated in FIG. 4, the net responsivity of this optical filter/detector combination embodiment is about 0.01 A/W.

As discussed above, existing multi-channel optical analyzers are useful, but have a variety of shortcomings. What has been needed are optical demultiplexing systems that may be miniaturized, may be manufactured for a cost effective price, are able to maintain optical precision and reliability or any combination of thereof.

SUMMARY

Some embodiments of an optical demultiplexing device may include at least one array of photo detector elements (rather than discreet sensors) and a demultiplexing assembly. The demultiplexing assembly may be optically coupled to the array and include multiple optical channels with each optical channel formed from at least one bandpass reflector and at least one optical filter. Each bandpass reflector may be disposed substantially along an input signal axis of the demultiplexing assembly and each channel may be configured to transmit an optical signal within a selected wavelength range to an active portion of the array of photo detector elements. The active portion of the array may also be isolated from active portions of photo detector elements of adjacent channels.

Some embodiments of an optical demultiplexing device may include at least one array of photo detector elements and a demultiplexing assembly. In some cases, the array of photo detector elements may be a continuous array of photo detector elements. The demultiplexing assembly may be optically coupled to the array of photo detector elements and include a plurality of optical channels with each optical channel formed from at least one bandpass reflector and at least one bandpass filter. The bandpass filter may be disposed in an optical filter cavity of a baffle assembly with the optical filter cavity being at least partially bounded by a support baffle disposed over an output surface of the filter. The support baffle may also include an output aperture. The baffle assembly may also include a filter baffle disposed between the filter cavity and an adjacent optical channel.

Some embodiments of an optical demultiplexing system include a first module which is in optical communication with a light signal and which includes a UV light detector array that is configured to detect UV light but not light having a wavelength greater than about 425 nm. The first module also includes an all dielectric bandpass filter for each optical channel therein. A second module may also be disposed in optical communication with the light signal and include a visible light detector array that is configured to detect a broad band of light signal and which includes an all dielectric bandpass filter for each optical channel.

Some embodiments of a method of demultiplexing and analyzing a light signal may include propagating a broad band white light signal through a sample to a first bandpass reflector of a demultiplexing assembly and reflecting a first spectral band of the light signal from the first bandpass reflector. The first spectral band may then be propagated through a first band pass filter of the demultiplexing assembly. The remaining spectra of light may be transmitted through the first bandpass reflector and propagated to a second bandpass reflector. A second spectral band of the light signal may then be reflected from the second bandpass reflector and propagated through a second band pass filter of the demultiplexing assembly. An amplitude of the first spectral band may be detected with a first active portion of a linear array of photo detectors after the first spectral band has passed through the first band pass filter. An amplitude of the second spectral band may be detected with a second active portion of the linear array of photo detectors after the second spectral band has passed through the second band pass filter.

Some embodiments of an optical demultiplexing device may include at least one continuous array of photo detector elements and a demultiplexing assembly. The demultiplexing assembly may be optically coupled to the array and the demultiplexing assembly may include multiple optical channels, each channel configured to transmit an optical signal within a selected wavelength range to an active portion of the array of photo detector elements which is isolated from active portions of photo detector elements of adjacent channels.

Certain embodiments are described further in the following description, examples, claims and drawings. These features of embodiments will become more apparent from the following detailed description when taken in conjunction with the accompanying exemplary drawings.

BRIEF DESCRIPTION OF THE DRAWINGS

The drawings illustrate embodiments of the technology and are not limiting. For clarity and ease of illustration, the drawings may not be made to scale and, in some instances, various aspects may be shown exaggerated or enlarged to facilitate an understanding of particular embodiments.

FIG. 5 is a perspective view of a demultiplexing system embodiment including a housing and linear photo detector array which is coupled to a pin receptacle of a PC board which is in operative communication with an optional processor and display unit.

FIG. 6 shows the demultiplexing system embodiment of FIG. 5 in conjunction with a light signal source including a light source configured to transmit light through a material sample and into an entrance pupil of the housing.

FIG. 7 is a perspective view of the demultiplexing system embodiment of FIG. 6A including a housing and linear photo detector array.

FIG. 7A is a perspective view of a linear photo detector array assembly.

FIG. 7B is a perspective view of a CCD chip type photo detector array assembly.

FIG. 7C is an enlarged view of an encircled portion of the photo detector array of the assembly in FIG. 7B.

FIG. 19 shows an embodiment of a compact demultiplexing system that includes an array of individual SiC photo detectors for a U.V. module and a Si linear photo detectors array for a visible module positioned adjacent each other to achieve a full 230 nm-1200 nm wavelength detection configuration (an infrared optical array may be employed to extend this wavelength range to about 4500 nm).

DETAILED DESCRIPTION

Figure 1:
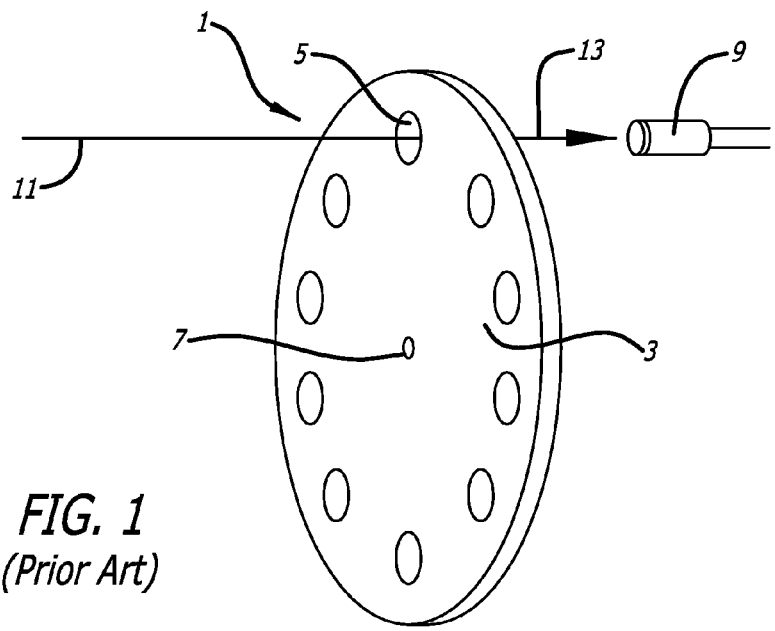
FIG. 1 shows an embodiment of an optical filter wheel.
Figure 2:
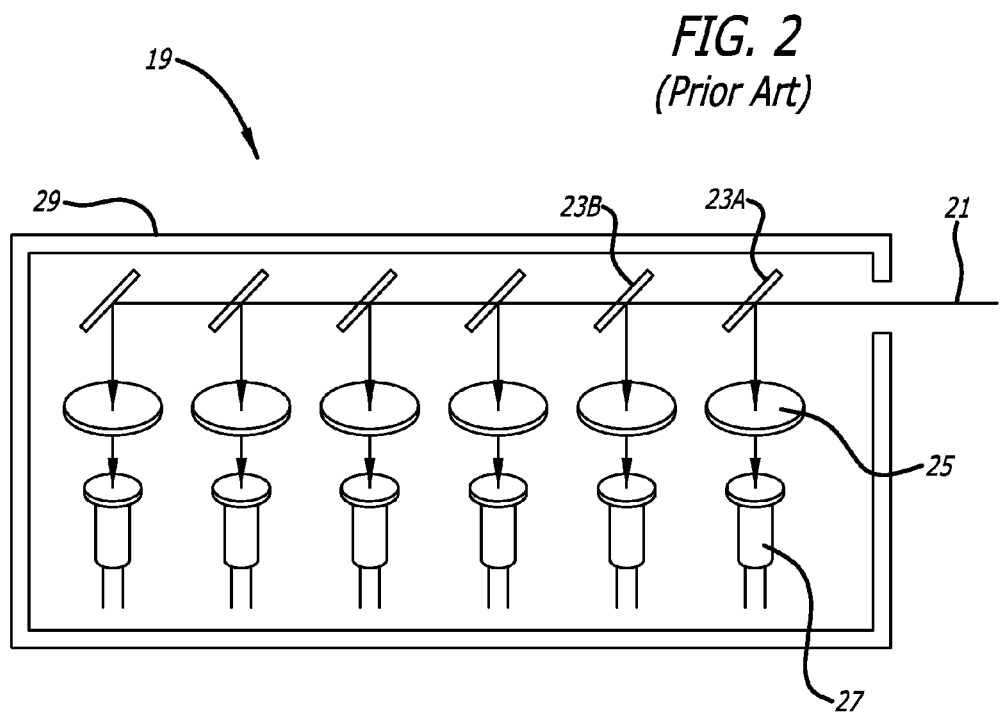
FIG. 2 shows an embodiment of an optical demultiplexing system with individual photo detectors for each channel.
Figure 3:
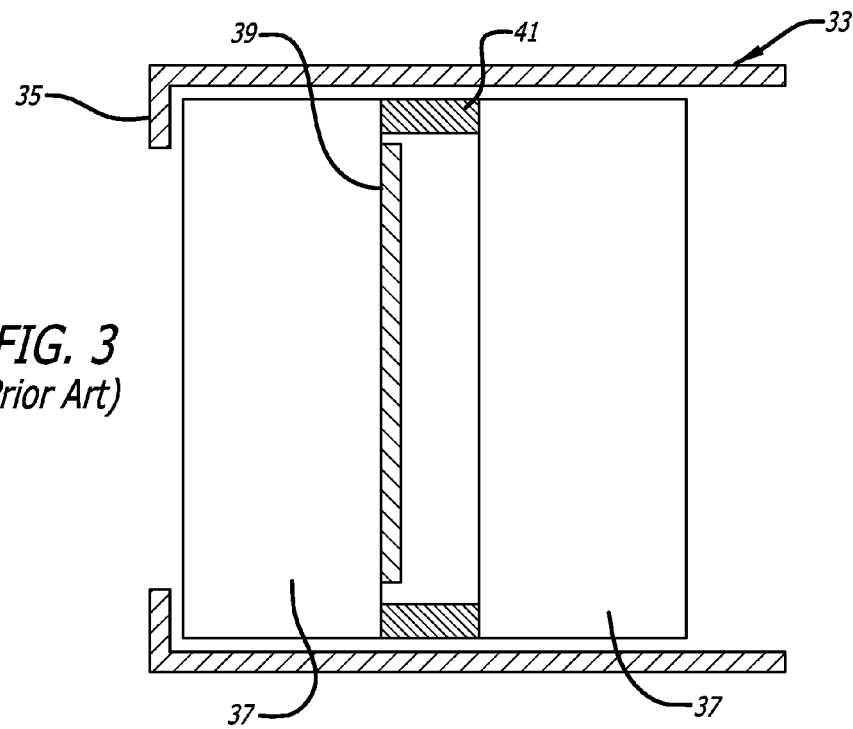
FIG. 3 shows a UV optical bandpass filter embodiment.
Figure 4:
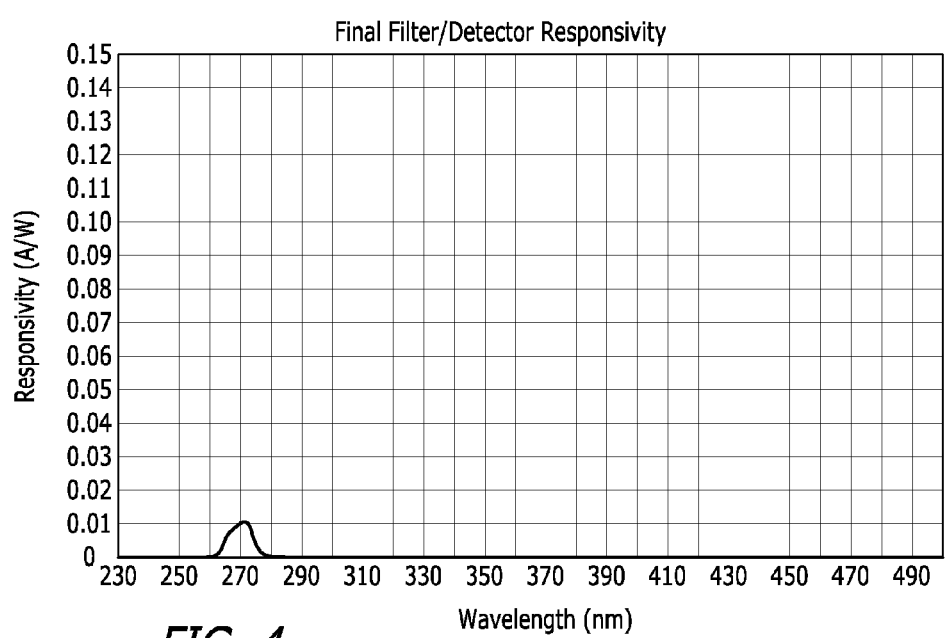
FIG. 4 is a graphical representation of a responsivity of a typical final optical filter/optical detector embodiment.

FIGS. 5-12 illustrate an embodiment of an improved performance miniaturized optical demultiplexing (hereinafter "MINI DEMUX") device. As shown, the MINI DEMUX device 60 includes at least one photo detector array which may be in the form of a linear photo detector array having a plurality of detector elements. Such a linear array may include a compact photodiode array 62 wherein each detector element or diode of the array may be disposed along a continuous linear configuration. In some cases, such continuous linear array configurations 62 may have each photo detector element thereof in contact or near contact with adjacent photo detector elements of the array 62. The photodiode array 62 may have at least one demultiplexing (hereinafter "DEMUX") assembly affixed thereto. In some cases, the photodiode array 62 may include a Hamamatsu S-4111-35Q device having a length L, as shown in FIG. 7. In some cases, the length L of the linear array may be less than about 3 inches, more specifically, less than about 2 inches. The Hamamatsu device, model S-4111-35Q and similar models are manufactured by Hamamatsu Photonics Corporation at 325-6, Sunayama-cho, Naka-ku, Hamamatsu City, Shizuoka Pref., 430-8587, Japan. Optionally, any variety of suitable photodiode devices or other photo detector devices in any variety of lengths, widths, or other transverse dimensions may be used.

The number of continuous or sequentially adjacent photo detector elements for the array 62 or any other array discussed below may have any suitable number of detector elements 72. For example, some array embodiments 62 may have about 10 detector elements 72 to about 100 detector elements 72 or more, more specifically, about 20 detector elements to about 50 detector elements, and even more specifically, about 30 detector elements to about 40 detector elements. An example of such a linear photo detector array 62 is shown in FIG. 7A. A suitable photo detector array 62 may also include embodiments in which the detector elements are not configured as a linear array, but are instead configured as a two dimensional array, such as might be found in a charged couple device (CCD) chip embodiment. FIGS. 7B and 7C illustrate an embodiment of a CCD type chip detector array 62' that has a plurality of detector elements 72' arranged in a two dimensional matrix. The pin configuration and electrical coupling of the CCD chip 62' may be the same as or similar to that of the linear array 62. For some embodiments of the photo detector arrays 62 and 62', the size of each photo detector element 72 or 72' may be small, for example, such detector elements 72 or 72' may have a transverse dimension of an input surface of about 1 mm to about 4 mm. As such, an array 62 suitable for a device 60 having about 8 channels to about 10 channels may have about 35 such detector elements 72 disposed in a linear array with an overall length of less than about 3 inches, more specifically, less than about 2 inches. The detector elements 72 or 72' may be configured to detect light and convert the incident light energy to electrical energy for a variety of wavelengths. In some cases, each photo detector element may be configured to convert incident light energy into a voltage that is proportional to or otherwise dependent on an amplitude or intensity of light incident thereon. In general, some array photo detector element embodiments 72 or 72' may be configured to detect and convert light having a wavelength of about 230 nm to about 4500 nm, more specifically, about 340 nm to about 1200 nm, as well as other wavelengths in some cases.

In some cases, the DEMUX assembly 64 as shown in FIG. 7 may be adhesively bonded to a face of the photodiode array 62. Optionally, any variety of techniques or devices may be used to affix the DEMUX assembly 64 to the photodiode array 62, including, without limitations, mechanical coupling, fasteners, housings, soldering, brazing, adhesives, and the like. In some embodiments, the DEMUX assembly 64 may be non-detachably coupled to the photodiode array 62. Optionally, the DEMUX assembly 64 may be detachably coupled to the photodiode array 62.

As shown in FIG. 5, the MINI DEMUX device 60 may, in some cases, be electrically coupled to a printed circuit (PC) board 63 through a pin receptacle 65 that is electrically coupled to the PC board 63. The array 62 may be coupled to the pin receptacle 65 by conductor pins 68 which extend from the array 62 and into plugs on the receptacle 65. The PC board 63 may include a variety of electrical circuitry which is in electrical communication with the compact photodiode array 62. The electronic circuitry of the PC board 63 may include signal amplifiers 67 and the like which may be configured to amplify output voltages of the photo detector elements 72 of the array 62. The PC board 63 may also optionally be in electrical or informational communication with a processor and or display device 63A. The processor 63A may include a computer and display monitor in some embodiments. One or more connection devices 68 may be formed on or in communication with the photodiode array 62. In some embodiments, the connection devices 68 comprise pins permitting the photodiode array 62 to be electrically coupled to a substrate such as, for example, PC board 63 or receptacle 65.

Figure 6A:
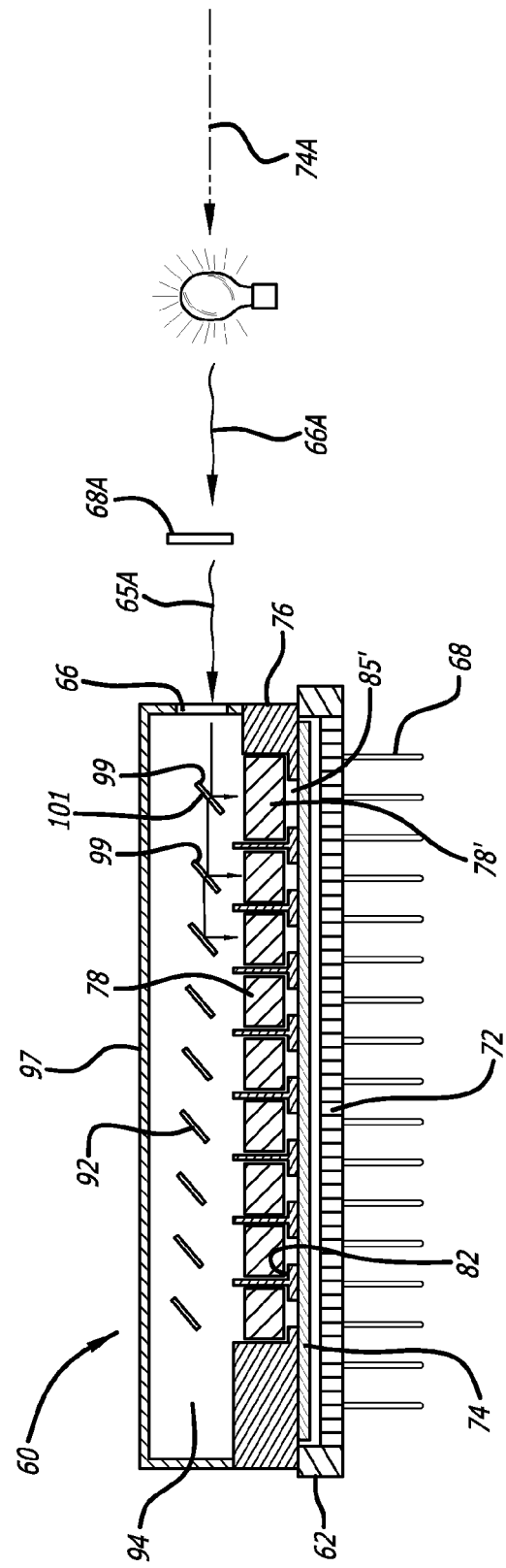
FIG. 6A is a schematic elevation view of the demultiplexing system embodiment of FIG. 5 having 9 optical channels.

Referring again to FIG. 5, the DEMUX assembly 64 includes a housing forming an enclosure having one or more input apertures 66 configured to receive at least one optical light signal 65A therein. For some embodiments, the housing forms an enclosure surrounding the components of the DEMUX assembly 64 which may prevent or reduce unwanted noise or light signal contact with the components of DEMUX assembly 64. Any of the device embodiments as shown in FIGS. 5-19 discussed herein may also receive a plurality of such optical or light signals 65A, such as two, three, four, five or more light signals 65A. FIG. 6 shows a schematic view of one possible arrangement of the MINI DEMUX device 60 in communication with a light signal 65A whereby the light signal 65A is generated by passing light 66A from a light source 67A through a material sample 68A. However, any suitable light signal may be analyzed by the device 60 regardless of source. In some embodiments, the light source 67A may include a broad spectrum light source such as a Xenon or Halogen type bulb. The light signal may also be collimated or partially collimated in some cases prior to entering an input aperture 66 of the device 60. The light signal 65A enters the input aperture 66 along an input axis as shown in FIG. 6A.

FIG. 6A shows a schematic representation of the MINI DEMUX device 60 in use. As shown, the photodiode array 60 of the MINI DEMUX devices 60 may include multiple photo detector elements 72. The photo detector elements 72 are arranged linearly for the embodiment shown in FIG. 6A. Optionally, the photo detector elements 72 may be arranged in any variety of configurations. Further, the photodiode array 60 may include a window 74 positioned thereon. As such, the photo detector elements 72 may be positioned within a hermetic seal by the window 74. As shown, the light signal 65A enters the device 60 along an input axis 74A which may continue linearly through the body of the demultiplexing assembly.

Figure 8:
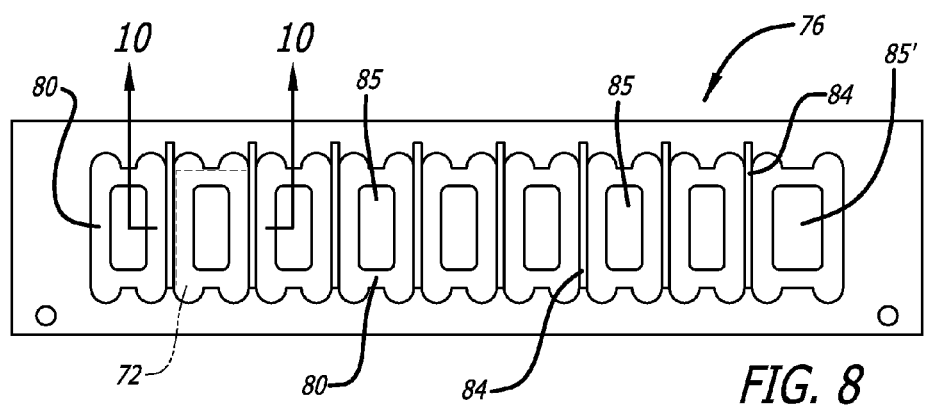
FIG. 8 is a top view of an optical baffle assembly embodiment.
Figure 9:
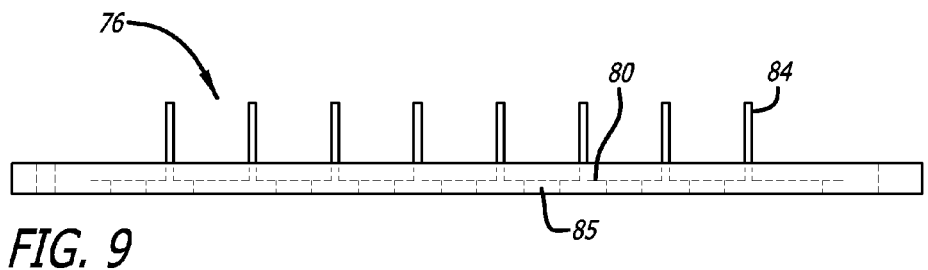
FIG. 9 is a side view of the baffle assembly embodiment of FIG. 8.
Figure 10:
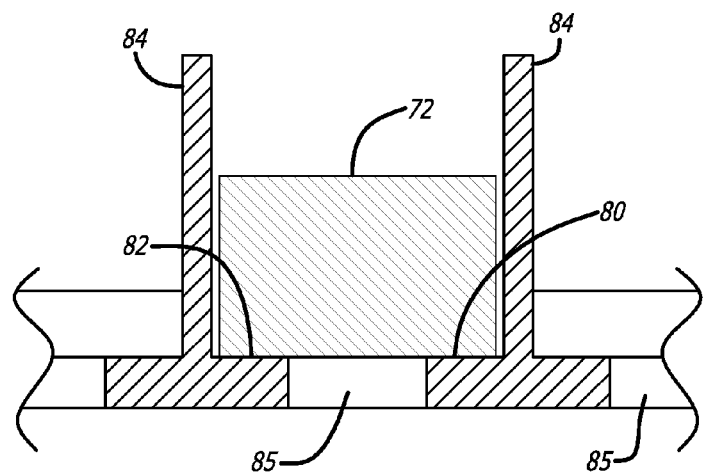
FIG. 10 is an enlarged view in section of the baffle assembly of FIG. 9 taken along lines 10-10 of FIG. 9.

A subassembly such as baffle assembly 76 as shown in FIGS. 8-10 may be configured to support at least one optical filter 78 proximate to at least one photo detector element 72 of the device 60. For some embodiments, each optical filter 78 may be configured as a bandpass filter 78 to pass a predefined narrow spectral band of light as may be needed for a desired application. For example, a first bandpass filter 78 may be configured to transmit light having a wavelength band centered at about 340 nm, while a second adjacent optical filter 78 may be configured to transmit light having a center wavelength of about 380 nm therethrough. As such, a series of optical bandpass filters 78 may be configured to individually transmit light having wavelengths centered at about 340 nm, 380 nm, 405 nm, 510 nm, 546 nm, 578 nm, 620 nm, 630 nm, 670 nm, 700 nm or 800 nm therethrough. In some cases, optical bandpass filters 78 may be configured and arranged so as to transmit the shortest wavelength band of the device to a channel closest to the input aperture 66 (i.e. filter 78') with subsequent optical bandpass filters 78 along the light signal path configured to transmit light of bands having sequentially increasing wavelength centers therethrough. In particular, filter 78' may be configured to transmit or pass a light band centered at about 340 nm, the next channel may be centered at about 380 nm, the next channel at 405 nm and so on. The wavelength band selectivity of each bandpass filter 78 may also function in conjunction with a selective reflectivity of each corresponding bandpass reflector 92 to define the spectral band for each channel of the demultiplexing assembly. In particular, in some cases, it may be desirable for both the bandpass reflector 92 and bandpass filter 78 to selectively narrow the spectral bandwidth of an incident beam (narrow the band at varying levels or amounts). Embodiments of such a demultiplexing device and any others discussed below may include the channel wavelengths discussed above, but may also include any appropriate number of channels having which may be configured to pass any desired spectral bandwidth centered at any desired wavelength, depending on the particular application.

In addition, for some embodiments, it may be desirable for the bandpass reflector 92 to reflect a predetermined band of light in a wavelength range that is broader than the ultimate band of the optical channel. The ultimate bandwidth of the channel may be refined or fine tuned by the corresponding bandpass filter 78 of the channel that passes a band of light at the desired range of wavelength for detection by the photo detectors 72 of the array 62. For the 340 nm channel discussed above, the bandpass reflector 92 might reflect a relatively broad sub-band of the input light signal of about 315 nm to about 360 nm, while passing the remaining band via transmission to the next bandpass reflector 92 in the optical train in some cases. In such a case, the 315 nm to 360 nm band encompasses or includes the ultimate desired band of the channel, but is broader and can be carried out with a less precise optic. The 315 nm to 360 nm band then propagates to the corresponding bandpass filter 78 of the channel disposed along an output axis of the bandpass reflector 92. The bandpass filter 78 then further narrows the band of the channel to the desired final spectral band for analysis, which may be about 335 nm to about 345 nm, with a center wavelength at the preselected 340 nm. Such a configuration may be useful for a variety of reasons. In particular, this configuration directs only wavelengths of interest to the bandpass filter 78 of a particular channel. Such a configuration may also allow the use of bandpass reflector 92 with a lower level of precision to be used, as the bandpass filter 78 will perform the final adjustment. In embodiments of the demultiplexing array where high precision components are desired, a bandpass filter 78 such as the model SSBF-340 (or the like) or bandpass reflector 92 such as the model SSBF-DC-340 (or the like), manufactured by Newport Corporation, Corion Products, 8 East Forge Parkway, Franklin, Mass. may be used.

In some cases, the bandpass reflector 92 may be configured to pass a bandwidth that is about 2 times to about 4 times the bandwidth of the corresponding bandpass filter 78. In addition, the manufacturing bandwidth or performance tolerances of the bandpass reflector 92 may be greater than those of the bandpass filters 78 for some embodiments. For example, in some cases, the bandwidth tolerances of the bandpass reflector 92 may be plus or minus about 5 nm, while the tolerance of the bandpass filters 78 may be plus or minus about 2 nm. As such, for some embodiments, a bandpass reflector 92 of an optical channel may reflect a light band having a width of less than about 50 nm, while the corresponding bandpass filter 78 of the same channel may further narrow the light signal to a bandwidth of less than about 15 nm, more specifically, less than about 12 nm, and even more specifically, less than about 10 nm. These parameters discussed above may also be applicable to all of the 380 nm, 405 nm, 510 nm, 546 nm, 578 nm, 620 nm, 630 nm, 670 nm, 700 nm or 800 nm channels, as well as any other suitable wavelength.

For some embodiments, very high precision bandpass reflectors 92 may be used without the use of bandpass filters 78 at all to form an optical channel of a demultiplexing assembly. In such embodiments, these reflectors 92 may reflect only a precise narrow wavelength range, such as the bands previously discussed above with regard to the bandpass filters 78. For example, the reflection bandwidth of a 340 nm bandpass reflector 92 may be configured to be about 10 nm (such as discussed above with regard to a 340 nm bandpass filter 78). This narrow spectral band may then be directed onto an appropriate exposed detector array element or elements 72. In this lower-cost configuration, optimal optical linearity and crosstalk may not be at the performance level of those configurations employing both bandpass reflectors 92 and bandpass filters 78, but may be adequate for particular application (nominal 2.5 OD versus 4.5 OD performance).

In addition, an opposite approach may be used wherein the bandpass reflectors 92 are configured with little or no spectral functioning, but merely serve to reflect or otherwise redirect a desired percentage of the incoming light signal in a lateral direction away from the light signal axis, through a bandpass filter 78, and on to one or more corresponding photo detector elements 72. In such an embodiment, all or most of the spectral narrowing function would be carried out by the bandpass filter 78 of an optical channel of the assembly prior to propagating the signal to the array 62 for detection. For some embodiments of such a configuration, the bandpass reflectors 92 may be completely omitted from the demultiplexing assembly and the light signal allowed to internally reflect in a somewhat random pattern within an interior volume of the demultiplexing housing of the assembly until portions of the light signal pass through a bandpass filter 78 of an optical channel and are thereafter detected by the array 62. For such embodiments, it may also be desirable for an interior surface of the interior volume 94 of the housing 97 of the demultiplexing assembly to be coated with a reflective coating or otherwise include a surface that is reflective to the light signal to minimize absorption of the light signal by the interior surface of the housing 97.

In addition to optionally being configured to generate the shortest wavelength of light signal passed to the array 62, the first channel closest to the input aperture 66 corresponding to filter 78' as shown in FIG. 6A may also have a larger aperture 85' in a support baffle thereof and be configured to transmit a light signal of the shorter wavelength to a larger area of the photo detector array 62 relative to that of adjacent channels. Regarding the bandwidth of the wavelength channels corresponding to wavelengths of about 340 nm, 380 nm, 405 nm, 510 nm, 546 nm, 578 nm, 620 nm, 630 nm, 670 nm, 700 nm or 800 nm, these may be selected based on the particular application of the MINI DEMUX device 60. In addition to being able to select any desired center wavelength for a particular channel, the bandwidth may also be selected in order to be narrow enough to provide a desired resolution and broad enough to allow a desired amount of signal to pass through the filter. The bandwidth may also be used to accommodate a varied responsivity of the detector array 62 as a function of wavelength. That is, channels having wavelengths with lower responsivity may be selected to have a broader bandwidth in order to allow more signal to pass through the filter 78 to the detector array 62. In some particular exemplary embodiments, the wavelength bands discussed above may be about 6 nm to about 12 nm, more specifically, about 8 nm to about 10 nm.

Referring again to FIGS. 8-10, the MINI DEMUX device 60 may include multiple baffles to reduce or prevent measurement error. For example, each channel of the demultiplexing assembly of the device 60 may include one or more support baffles 80 and one or more filter baffles 84 which may be part of an integral baffle assembly 76. The support baffles 80 may include a support surface 82 configured to provide a ledge disposed about a bottom portion of each filter cavity and engage and support the optical filters 78. As such, in some cases, a bottom surface of the bandpass filter 78 may be in contact with the support surface 82 of the corresponding support baffle 80 as shown in FIG. 10. The support baffles 80 may also include an aperture 85. The baffles 80 and 84 may be configured to reduce or eliminate "bleed-by", i.e., extraneous light from traveling around each optical filter 78 (which could significantly introduce measurement error). Further, in order to maximize or otherwise control output signal, the aperture 85 of the support baffle 80 of each optical filter 78 may be sized to transmit light to one or more detector elements 72 of the array 62. For some embodiments, to help isolate each channel (thus reducing or preventing crosstalk), one or more inactive photo detector elements 72 may separate each one or more active photo detector elements 72, thus creating active portions of the array and inactive portions of the array as discussed in more detail below with regard to the embodiment of FIGS. 13 and 14. In some cases, the inactive portions of the array may include one or more photo detector elements 72 that are grounded. As such, the connectors 68 associated with the inactive portion or region may be left coupled to ground or eliminated. In some cases, the active portion of an array 62 onto which an aperture 85 is configured to project a light signal may include one detector element or a plurality of detector elements. For some particular embodiments, each active region of three photo detector elements may be separated by a single inactive photo detector element, however, any suitable or desirable configuration may be used in this regard.

The filter baffles 84 may be positioned between the optical bandpass filters 78 such that they are disposed in a gap formed between the lateral sides of optical bandpass filters 78 which are adjacent each other. In some cases, the filter baffles may be in contact with the lateral sides of the bandpass filters, in other embodiments, there may be a gap between an outer surface of the filter baffle 84 and the adjacent bandpass filter 78. For some configurations, the support baffle 80 and filter baffle 84 of each channel in combination with adjacent portions of the walls of the housing may form a filter cavity. Such a filter cavity may be configured to restrict light incident on the active portion of the array of the channel to the band corresponding to that channel. As such, the filter baffles 84 optically isolate the optical filters 78 and active detector regions 86 from scattered, misdirected, or unwanted light from neighboring optical channels, thereby improving measurement accuracy over prior art devices. The filter baffles 84 may be manufactured from any variety of materials in a variety of configurations so long as they provide a barrier disposed between adjacent filter elements 78 that a light signal 65A can not pass through. Matt black anodized aluminum may be used for the baffle embodiments 80 and 84 in some cases. As shown in FIGS. 9-10, the filter baffles 84 may be configured to have a continuous structure with respect to the support baffles 80. In some instances, a bottom edge of the filter baffles 84 may be disposed on or continuous with a top surface of a corresponding adjacent support baffle 80 such that no gap exists there between and no portion of a light signal 65A may pass between the filter baffle 84 and support baffle 80.

For the baffle assembly embodiment 76 shown in FIGS. 8-10, the baffle assembly 76 may be in the form of a continuous monolithic structure that includes a base plate and the baffle structures thereon formed from a single piece of material. In some cases, such an assembly 76 may be machined from a single piece of aluminum or other suitable material. As shown in FIG. 10, the filter baffles 84 may also extend vertically above an input surface of the adjacent corresponding filter 78 so as to prevent transmission of light that is reflected or scattered from one filter 78 to adjacent channels.

Figure 11:
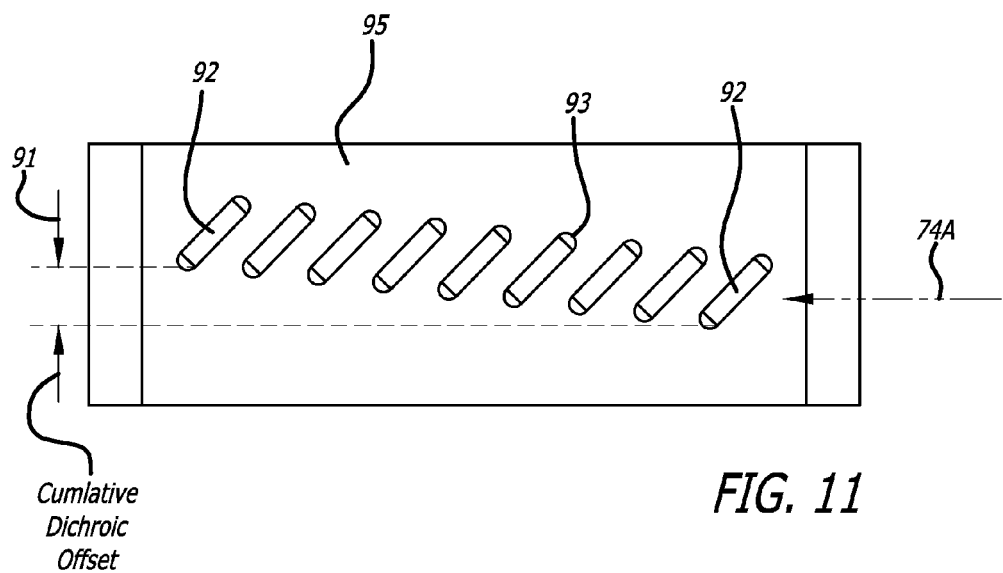
FIG. 11 is an elevation view of a bandpass reflector mount assembly.
Figure 12:
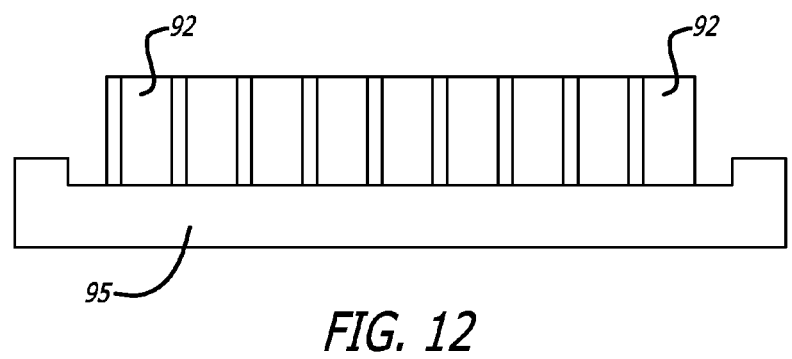
FIG. 12 is a top view of the bandpass reflector mount assembly of FIG. 11.

Referring again to FIG. 6A, at least one bandpass reflector such as a dichroic beam splitter 92 may be positioned within the cavity 94 formed within a housing of the MINI DEMUX device 60 for each channel of the device 60. Each bandpass reflector 92 may be disposed adjacent to and in optical communication with a corresponding filter 78 for each channel of the device 60. For some embodiments, the bandpass reflector 92 may include a dichroic mirror configured to reflect a desired wavelength band of a light signal 65A in a lateral orientation away from the input axis 74A of the light signal 65A and towards the optical filter 78, while transmitting substantially all light outside the desired wavelength band therethrough along the input axis and optionally on to the next bandpass reflector 92 in the optical train of the demultiplexing assembly. A variety of devices may be used as bandpass reflectors, including, without limitation, mirrors including dichroic mirrors optical filters, gratings, and the like. In some instances, an optical filter 78 and corresponding adjacent bandpass reflector 92 of the same channel for each channel of a device 60 may be wavelength matched, thereby transmitting a narrow bandwidth of light therethrough to the array 62 for detection and intensity measurement of each band or channel. For the dichroic beam splitter embodiments of the bandpass reflector 92 shown in FIG. 11, as well as other embodiments, each bandpass reflector 92 may have a plate-like configuration and be disposed at an angle of about 45 degrees relative to the input signal axis 74A. In some cases, the bandpass reflectors 92 may be disposed at an angle of about 42 degrees to about 48 degrees with respect to the input signal axis 74A. Each bandpass reflector 92 may also be firmly held in place at a desired angle with respect to the input signal axis 74A in a corresponding slot 93 of a housing portion or side panel 95 of the housing 97 of the demultiplexing assembly as shown in FIGS. 11 and 12. Generally, each of the slots 93 in the side panel 95 of the housing 97 may be substantially parallel to each other as will the bandpass reflectors 92 disposed therein, although this is not essential. The bandpass reflector slots 93 of the side panel 95 of the housing 97 may also be laterally offset in a sequential format shown as a dichroic offset in FIG. 11 and discussed in more detail below.

As a result of this configuration, the bandpass reflector 92, optical filter 78 and adjacent corresponding active region 86 of the photodiode array 62 may form or define an optical channel of the device 60. The bandpass reflectors 92 may be collinearly aligned in some cases. In some embodiments, the bandpass reflectors 92 need not be collinearly aligned. For example, if dichroic beam splitters are used for the bandpass reflectors 92, each device 92 may be laterally offset slightly relative to each adjacent bandpass reflector 92 in order to accommodate the displacement of the light signal as it is refracted by the bandpass reflector 92. As shown in FIG. 11 and in later embodiments in FIG. 14, the bandpass reflectors 92 and 192 may be configured with a dichroic offset and may be sequentially offset in a lateral orientation slightly along the input axis to accommodate a lateral shift in the light signal in the direction of the tilt of the bandpass reflector 92. The shift in the light signal occurs as the light signal passes or refracts through each bandpass reflector 92 with an altered internal angle due to the index mismatch of the bandpass reflector 92 and surrounding air. The amount of the lateral shift relative to the axis 74A may be primarily dependent on the thickness of the bandpass reflector 92. The overall or cumulative dichroic shift from the first bandpass reflector 92 to the last bandpass reflector 92 along the optical path or train of the input axis 74A may be substantial as shown in FIG. 11. For a 9 channel MINI DEMUX device 60 such as shown in FIGS. 5-12, having an overall length of less than about 2 to 3 inches, each bandpass reflector 92 may be separated from adjacent bandpass reflectors 92 by a distance of less than about 4 mm in some cases. In addition, each active portion of the array 62 may have a center which is separated from a center of an adjacent active portion by a distance of less than about 1 mm for some embodiments.

For some embodiments, during use, a light signal 65A enters the input aperture 66 of the demultiplexing assembly 64 and propagates to an input surface 99 of a first bandpass reflector 92 along the input axis 74A as shown in FIG. 6A. The first bandpass reflector embodiment 92 may be in the form of first dichroic beam splitter 92 which, as discussed above, reflects a first spectral band of the light signal from an input surface thereof such that the beam of the first spectral band may be directed laterally away from light signal axis 74A. For some embodiments, the first spectral band may be the shortest wavelength band of all channels of the device 60. The reflected first spectral band then propagates through a first band pass filter 78' of the demultiplexing assembly 64. Also as discussed above, the first bandpass filter 78' may be larger than the subsequent bandpass filter 78 disposed adjacent thereto. The aperture 85' is disposed in the support baffle 80 below the first bandpass filter 78' at an output surface of the filter 78' may also be larger in area than the apertures 85 of adjacent channels.

The remaining spectra of light that has not been reflected by the first bandpass reflector 92 may then be transmitted or propagated from an output surface 101 of the first bandpass reflector 92 and propagated to an input surface 99 of a second bandpass reflector 92 which may also be in the form of a second dichroic beam splitter which is disposed along the input axis 74A of the device 60. A second spectral band of light may be reflected by this second dichroic beam splitter and directed to a second bandpass filter 78. Thereafter, the remaining spectra of light which is not reflected by the second bandpass reflector 92 may be transmitted through the second bandpass reflector 92 and propagated to a third bandpass reflector 92. A third band of light may then be reflected by this third bandpass reflector 92 and directed to a third band pass filter 78 of the demultiplexing assembly 64. This process may be carried out for each channel of a particular device 60 and may continue until a final spectral band is reflected from the final bandpass reflector 92 of a final channel in the optical train of the device 60. This final spectral band may be transmitted through the final bandpass filter 78. After the first spectral band passes through the first bandpass filter 78', the first spectral band then propagates to a first active portion of the photo detector array 62 and an amplitude thereof detected by the first active portion of the array 62. The intensity or amplitude of the second spectral band is then detected by a second active portion of the array 62 after propagating through the second bandpass filter 78 and impinging on active photo detector elements of the second active portion of the array.

For some embodiments, the method above may include analyzing the amplitude of the first spectral band and subsequent spectral bands to obtain an analytical result regarding the light signal. For some embodiments, a light beam may be passed through a material sample in order to generate the light signal that enters the device 60 for analysis. Such a light signal that has passed through the sample material may also be compared to a light signal that is not passed through a material sample such that the absorption properties of the sample material at different frequencies. In some cases, the amplitude of the first spectral band may be detected by an isolated first active portion of linear array which is separated from the second active portion of the linear array by an inactive portion of the linear array. In some cases, the first spectral band may propagate from the first bandpass reflector to an input surface of the first band pass filter over a distance of less than about 4 mm. For some embodiments, the second spectral band may propagate from the second bandpass reflector to an input surface of the second band pass filter over a distance of less than about 4.5 mm and the third spectral band propagates from the first band pass device to the second band pass device over a distance of less than about 5 mm.

Figure 13:
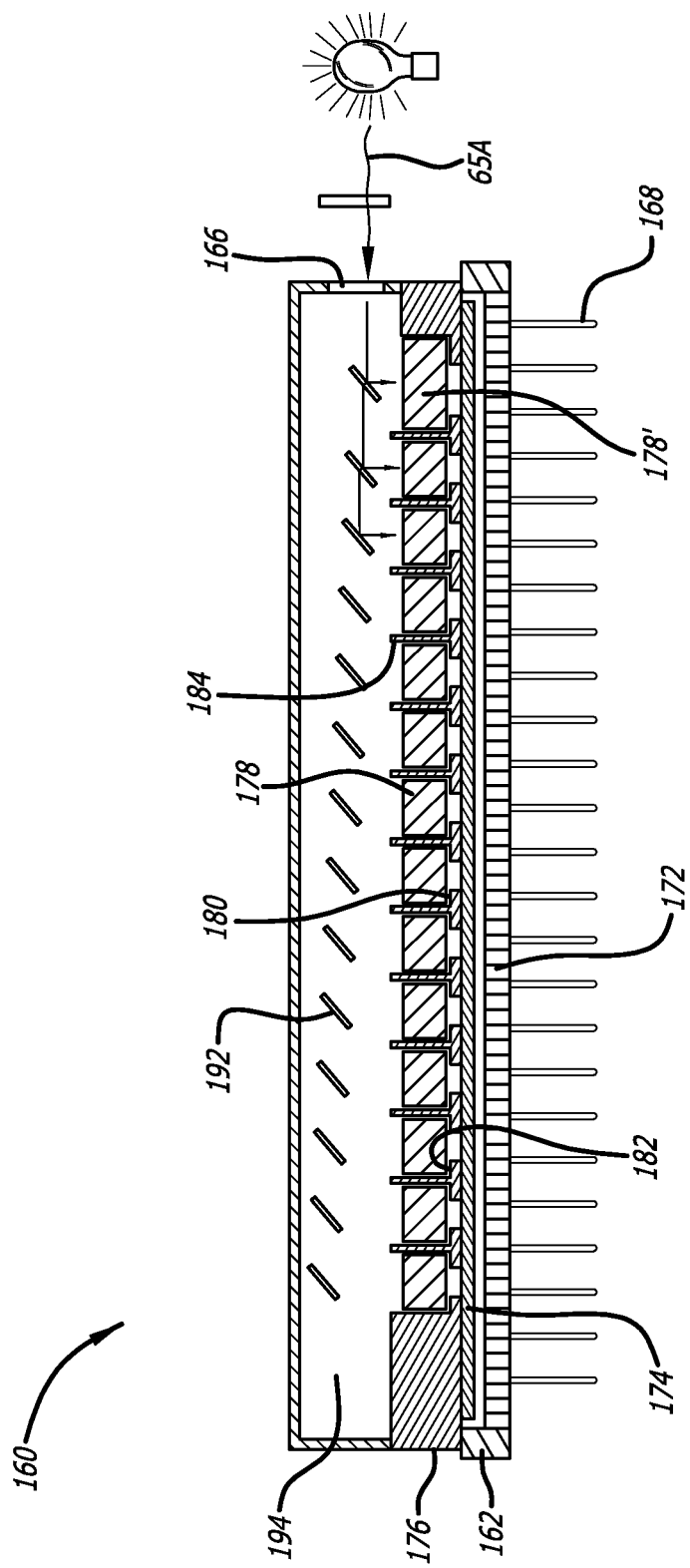
FIG. 13 is a schematic elevation view of a demultiplexing system embodiment having 14 optical channels.
Figure 14:
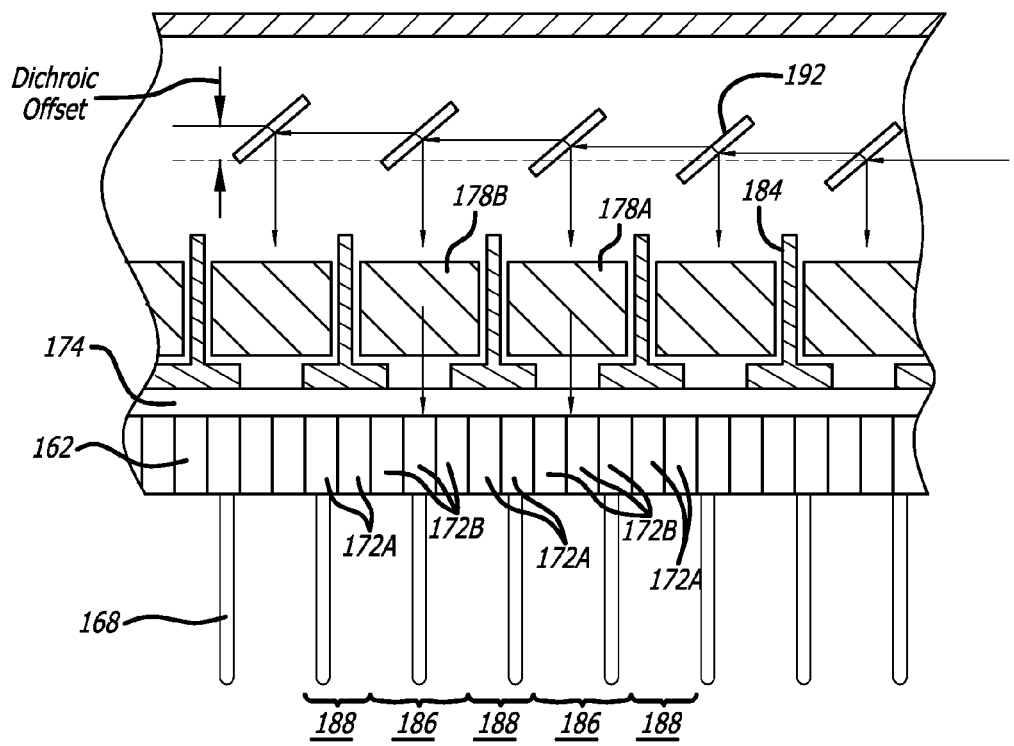
FIG. 14 is an enlarged view in partial section of the demultiplexing system of FIG. 13.

FIGS. 13 and 14 show a schematic cross-sectional view of another embodiment of a MINI DEMUX device 160 that includes 14 channels instead of the 9 channels of the device 60 discussed above. In addition, the device 160 may have any or all of the same features, dimensions or materials as those discussed above with regard to MINI DEMUX device 60, and vice versa. As shown, the photodiode array 160 of the MINI DEMUX device 160 may include multiple photo detector elements 172. As shown, the photo detector elements 172 of the array are arranged linearly. Optionally, the photo detector elements 172 may be arranged in any other suitable configuration. Further, the photodiode array 160 may include a window 174 positioned and sealed thereon. As such, the photo detector elements 172 may be positioned within a hermetic seal by the window 174.

A baffle subassembly 176 may be configured to support at least one optical filter 178 proximate to at least one photo detector element 172 of the array 162. For some embodiments, each optical filter 178 may be configured to pass a predetermined spectral band of light which may be as broad or narrow as required for a particular desired application. For example, optical filter 178A may be configured to transmit light having a wavelength of about 340 nm, while the adjacent optical filter 178B may be configured to transmit light having a wavelength of about 380 nm therethrough. As such, a series of optical filters 178 may be individual elements configured to individually transmit light having a band with a wavelength centered at 340 nm, 380 nm, 405 nm, 510 nm, 546 nm, 578 nm, 620 nm, 630 nm, 670 nm, 700 nm and 800 nm therethrough. As discussed above, the bandwidth for the bands centered at the above wavelengths or any other set of desired wavelengths may also be adjusted as desired by the construction of the bandpass filter elements 178 for a desired application.

For some embodiments, optical filter 178' may be configured to transmit a bandwidth of the shortest wavelength of light signal therethrough, with subsequent optical filters 178 along the optical train of the device 160 configured to transmit light of increasing wavelength therethrough. The bandpass filter 178' disposed at the beginning of the DEMUX assembly 164 adjacent the aperture 166 may also be larger than other filters and the aperture 185' of the support baffle 182' may also be larger than other apertures in order to cover more detector elements than adjacent channels. Coverage of a greater number of detector elements 172 may be used in some embodiments in order to compensate for decreased responsiveness of the detector elements 172 at certain light signal wavelengths. The compensation effect results because the light signal at the beginning of the device 160 has also been subjected to less attenuation due to reflection and absorption relative to the light signal that has passed through one or more bandpass reflectors or beam splitters 192.

The MINI DEMUX device 160 may also include multiple baffles to prevent or reduce measurement error. For example, the device 160 may include one or more support baffles 180 and one or more filter baffles 184. The support baffles 180 may include a support surface 182 configured to engage and support the corresponding or matched optical filter 178 and may be configured to reduce or eliminate "bleed-by", i.e., extraneous light from traveling around each optical filter 178 (which could significantly introduce measurement error). Further, in order to maximize output signal, each optical filter 178 may be sized to transmit light to one or more detector elements 172. In some cases, to help isolate each channel (thus, preventing crosstalk), one or more inactive photo detector elements 172A of an inactive portion of the array 162 may separate each one or more active photo detector elements 172B of an active portion of the array 162, thus creating active channel regions 186 and inactive channel regions 188. For some embodiments, the inactive photo detector elements 172A may be electrically grounded in order to deactivate the elements 172A and also to cut off the drift or migration of electrons across the semiconductor material of the inactive portions of the array 162. As such, the connectors 168 associated with the region may be left coupled to ground or eliminated.

The filter baffles 184 shown in FIGS. 13 and 14 may be positioned between the optical filters 178. As such, the filter baffles 184 may serve to optically isolate the optical filters 178 and active detector regions 186 from scattered, misdirected, or unwanted light from neighboring optical channels, thereby improving measurement accuracy. The filter baffles 184 may be manufactured from any variety of materials in any variety of configurations as discussed above. Performance of this device may exceed the performance of some current devices (linearity and crosstalk) by about two orders of magnitude (4.5 OD as compared to 2.5 OD) in some cases.

Referring still to FIGS. 13 and 14, at least one bandpass reflector 192 may be positioned within the cavity 194 formed within a housing of the of the MINI DEMUX device 160. For some embodiments, the bandpass reflector 192 comprises a dichroic mirror configured to reflect a band of light centered at a desired wavelength to the optical filter 178, while transmitting substantially all light of different wavelengths therethrough. Any variety of suitable devices may be used as bandpass reflectors, including, without limitation, mirrors including dichroic beam splitting mirrors, optical filters, gratings, and the like. As such, in some embodiments, the optical filter 178 and bandpass reflector 192 may be wavelength matched, thereby transmitting a narrow bandwidth of light therethrough. As a result, the bandpass reflector 192, optical filter 178 and adjacent corresponding active region 186 of the photodiode array 162 may include an optical channel. In the illustrated embodiment, the bandpass reflectors 192 may be collinearly aligned. In alternate embodiments, the bandpass reflectors 192 need not be collinearly aligned. For example, if dichroic beam splitters are used for the bandpass reflectors 192, they may be offset relative to each other in order to accommodate the displacement of each refracted portion of the light signal as discussed above.

Figure 15:
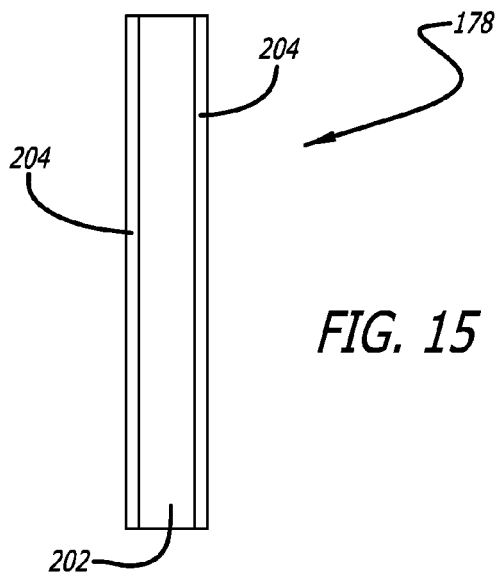
FIG. 15 shows a cross-sectional view of a low-cost single substrate UV filter embodiment.

FIG. 15 shows the cross-sectional view of an embodiment of an optical filter 178 for use in the MINI DEMUX device 60, 160 or any other suitable demultiplexing embodiment discussed herein. The filter 178 includes a single thin fused silica substrate 202. In some cases, the substrate may have a thickness of about 0.5 mm to about 1 mm, more specifically, about 0.6 mm to about 0.8 mm, and even more specifically, about 0.7 mm, although the substrate may be manufactured from any variety of materials in any variety of thicknesses, diameters, and transverse dimensions. One or more optical coatings 204 may be applied to the substrate 202. Any variety of suitable materials may be used to form the optical coating with desired properties. For some embodiments, the optical coating 204 may be applied to a single surface of the substrate 202. For other embodiments, the optical coating 204 may be applied to both surfaces or multiple layers of the substrate 202. Further, multiple optical coatings 204 or layers thereof may be applied to the substrate 202.

In some cases, the optical coating 204 may include multilayer films of hard, durable, environmentally resistant dielectric materials, such as hafnium or zirconium oxide and silicon dioxide. Unlike, prior art devices using metal-based optical coatings, no hermetic seals are required to protect the device from environmental degradation. As such, substantially all light reflection may be accomplished via optical reflection, not absorption. The resultant in-band transmission of light within a desired wavelength range may therefore be much higher than an MDM type filter (about 90%). In addition, the present all-dielectric approach may permit the DEMUX 164 to be coupled to silicon carbide-based (SiC) detectors, in addition to pure silicon-based detectors (Si). Whereas Si has spectral sensitivity up to about 1200 nm, SiC has spectral sensitivity up to only about 425 nm (the detector device based on SiC may be optically blind at all wavelengths longer than 425 nm). As a result, SiC may be ideal for use with the present all-dielectric bandpass filters disclosed herein. Significantly, the cost of such all-dielectric optical filters is far lower than the commonly used MDM bandpass optical filters.

Figure 16:
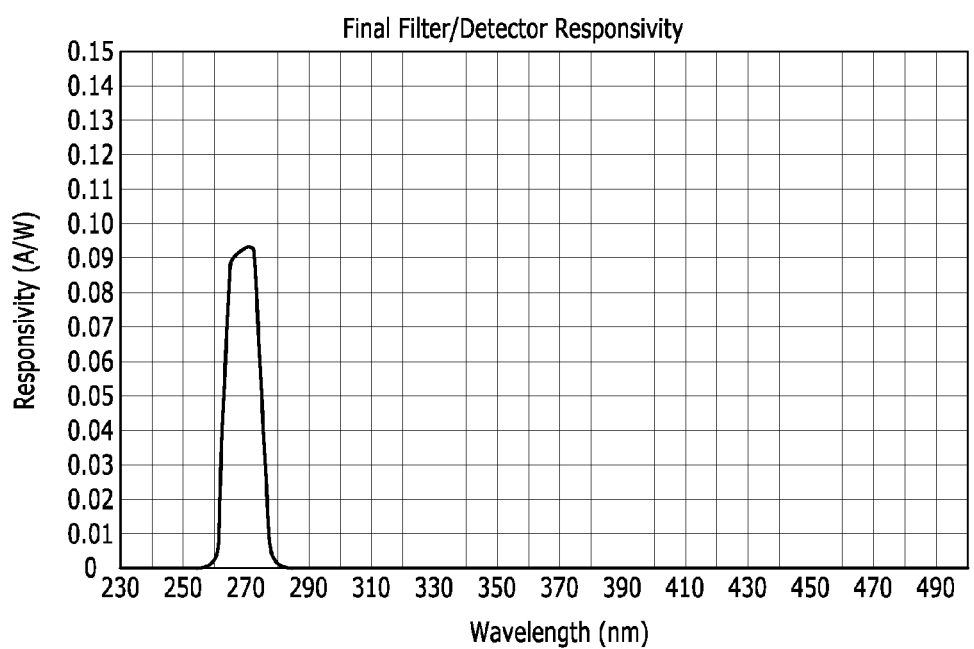
FIG. 16 is a graphical representation of a responsivity of an embodiment of a final optical filter/photo detector.

FIG. 16 shows graphically the net optical filter/detector responsivity A/W of an embodiment of a MINI DEMUX device 60 or 160 in the typical UV range (230 nm-320 nm). More specifically, FIG. 16 shows the performance of an exemplary 270 nm all-dielectric filter 178, as shown in FIG. 15, when mated with a silicon carbide photodiode. At this wavelength, typical silicon carbide photodiodes may have a responsivity of about 0.1 A/W. As illustrated in FIG. 16, the net responsivity of this optical filter/detector combination may be about 0.09 A/W, almost an order of magnitude better than some MDM/silicon detector combination embodiments. In addition, unlike Si, SiC photo sensors are typically robust against ultraviolet light exposures, have improved field longevity and have long-term stability.

Figure 17:
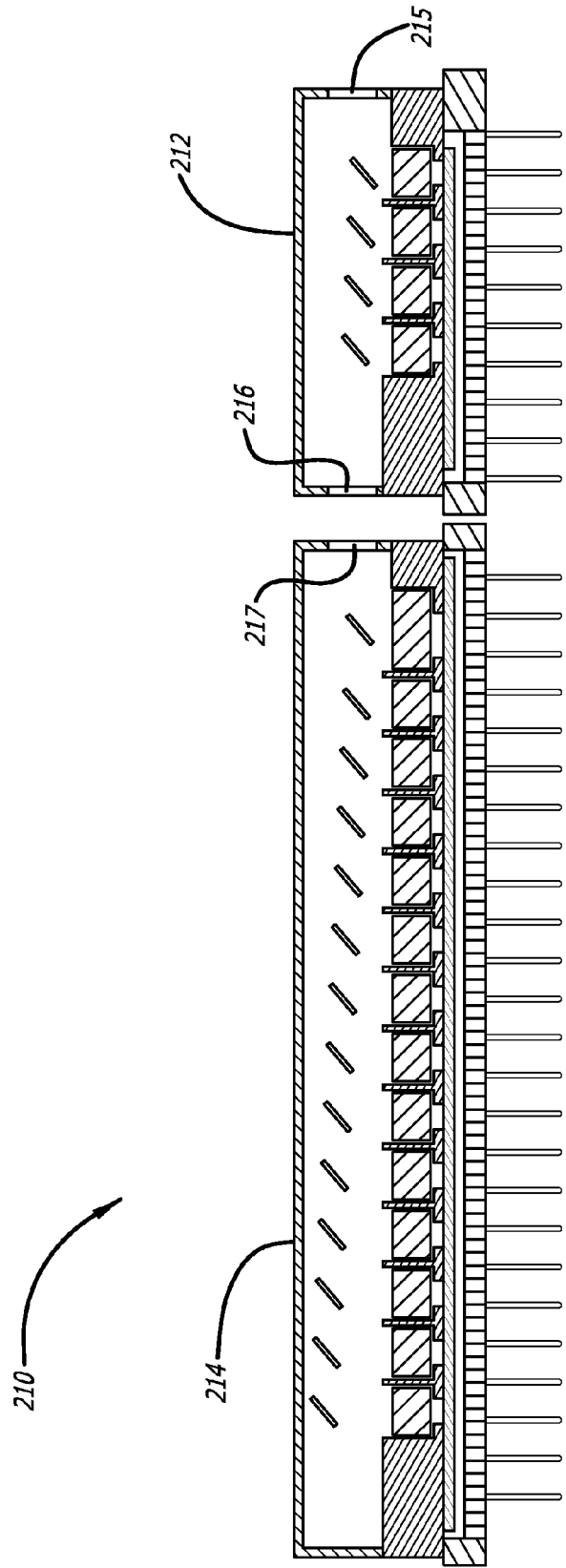
FIG. 17 shows an embodiment of a demultiplexing system including a UV compatible module having a Silicon Carbide (SiC) based linear array and a Si based linear photo detector array for use within the visible positioned along the same optical axis.

FIG. 17 shows a cross sectional view of an embodiment of a broad-spectrum linear MINI DEMUX device. In general, the MINI DEMUX device 210 shown in FIG. 17 may have any of the suitable features, dimensions or materials as those of the MINI DEMUX devices 60 and 160 discussed above, however, the device 210 also includes some additional features. As shown, the MINI DEMUX device 210 comprises a first DEMUX assembly or module 212 that includes an inlet aperture 215 and an outlet aperture 216 having an output axis. The device 210 also includes at least one second DEMUX assembly or module 214 which has an inlet aperture 217 which is optically coupled to the outlet aperture 216 of the first module 212. The first and second DEMUX assemblies may be manufactured as described above and may generally include the same or similar features, dimensions and materials to those of devices 60 and 160. However, each DEMUX assembly 212, 214 is particularly configured to detection of discreet wavelength ranges. For example, for some embodiments, the first DEMUX assembly 212 may be configured for detection of UV light up to a wavelength of about 380 nm, while the second DEMUX assembly 214 may be configured for detection of light having a wavelength of about 380 nm or more. As such, the bandpass reflectors 192, filters 178, and detector elements 172 may differ between DEMUX assembly 212 and DEMUX assembly 214.

Figure 18:
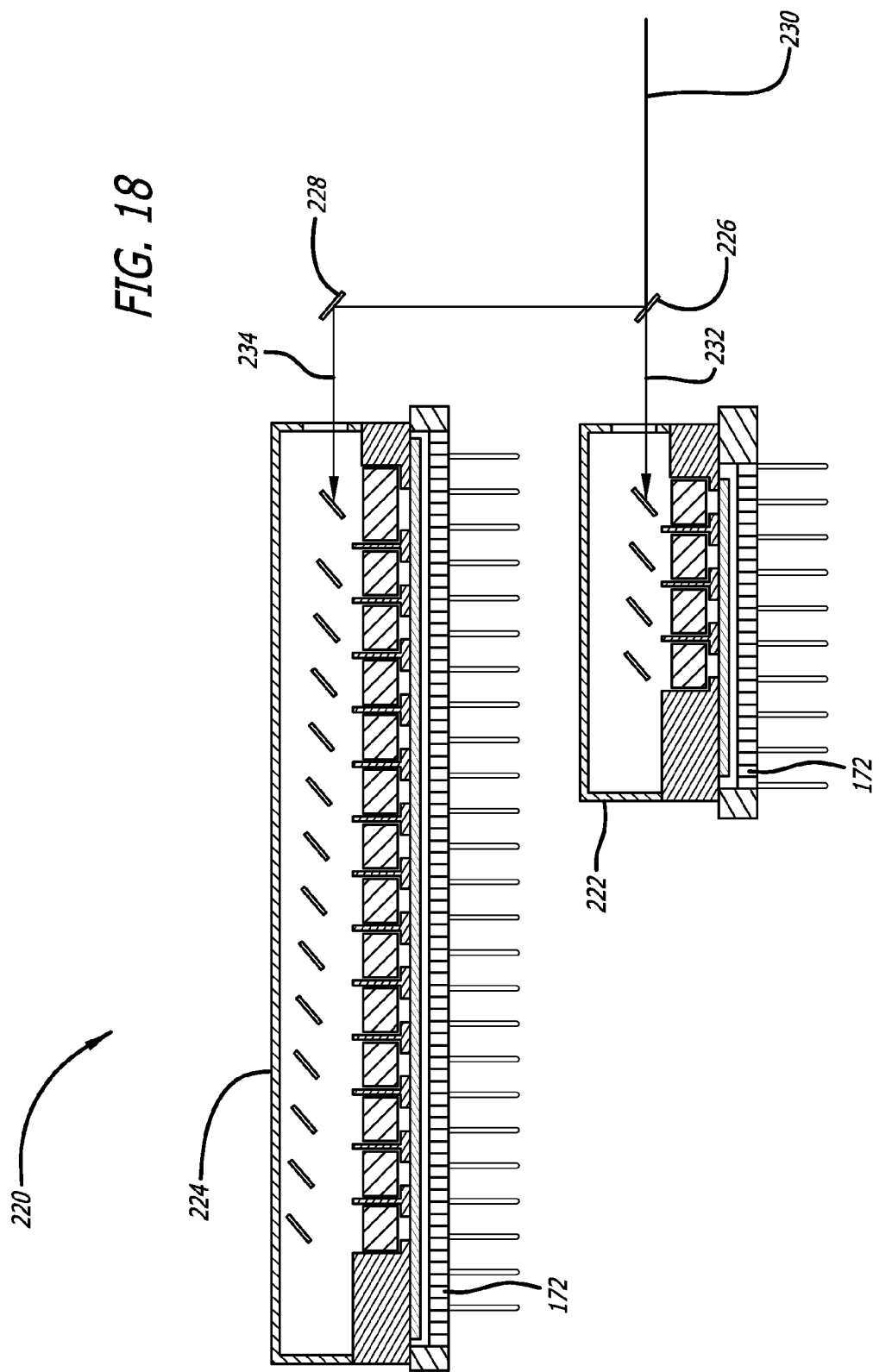
FIG. 18 shows an embodiment of a compact demultiplexing system that includes a SiC linear array for a U.V. module and a Si linear photo detector array for a visible module positioned adjacent each other to achieve a full 230 nm-1200 nm wavelength detection configuration (an infrared optical array may be employed to extend this wavelength range to about 4500 nm).

FIG. 18 shows an embodiment of a compact multi-module demultiplexing system that includes a SiC linear array for a U.V. module and a Si linear photo sensor array for a visible module positioned adjacent each other to achieve a full 230 nm-1200 nm wavelength detection configuration (an infrared optical array may be employed to extend this wavelength range to about 4500 nm). In general, the MINI DEMUX device 220 shown in FIG. 18 may have any of the suitable features, dimensions or materials as those of the MINI DEMUX devices 60 and 160 discussed above, however, the device 220 also includes some additional features. In particular, FIG. 18 illustrates an alternative embodiment wherein multiple DEMUX assemblies or modules may be positioned in parallel. As shown, the MINI DEMUX device 220 includes a first DEMUX assembly 222 and a second DEMUX assembly 224. As illustrated a first bandpass reflector 226 and second band pass device of reflector 228 may be used to direct light into the DEMUX assemblies 222 and 224. During use, an optical or light signal 230 may be incident on the first bandpass reflector 226 which directs light outside a selected bandpass range to the second bandpass reflector 228. Light 232 within the bandpass range is transmitted through the first bandpass reflector 226 to the first DEMUX assembly 222. Similarly, the light 234 reflected by the first bandpass reflector 226 may be directed into the second DEMUX assembly 224 by the second bandpass reflector or reflector 228. Like the previous embodiment, each DEMUX assembly 222, 224 may be configured to detect light within a discreet wavelength range. Further, any number of DEMUX assemblies may be coupled in linear or parallel configuration. For example, a deep UV DEMUX assembly, UV DEMUX assembly, visible light DEMUX assembly, near IR DEMUX assembly, and far IR DEMUX assembly may be coupled in linear or parallel configuration.

FIG. 19 shows an embodiment of a compact demultiplexing system that includes an array of individual SiC photo sensors for a U.V. module and a Si linear photo detector array for a visible module positioned adjacent each other to achieve a full 230 nm-1200 nm wavelength detection configuration (an infrared optical array may be employed in some cases to extend this wavelength range to about 4500 nm). In general, the MINI DEMUX device 220' shown in FIG. 19 may have any of the suitable features, dimensions or materials as those of the MINI DEMUX devices 220 discussed above, however, the device 220' also includes some additional features. The embodiment includes an alternative multiplexing device 220' where the short wavelength module 222' employs small discreet SiC (or similar) photo sensors 172', while the longer wavelength module 224 continues to employ the Si linear array as previously described. Such small sensors 172' may for example be sealed within standard 5 mm TO-18 housings. Mounts, baffles and other design features may mimic those of the embodiment shown in FIG. 14 and discussed above. This module may be produced in either, the series or compact-parallel configurations. As a direct cost comparison, a four-channel UV module of this invention has a manufacturing cost of about $85 as compared to about $1000 for current-art MDM/Si sensor based approaches (this is in addition to the increase in signal by nearly an order of magnitude).

With regard to the above detailed description, like reference numerals used therein may refer to like elements that may have the same or similar dimensions, materials and configurations. While particular forms of embodiments have been illustrated and described, it will be apparent that various modifications can be made without departing from the spirit and scope of the embodiments of the invention. Accordingly, it is not intended that the invention be limited by the forgoing detailed description.

The entirety of each patent, patent application, publication and document referenced herein is hereby incorporated by reference. Citation of the above patents, patent applications, publications and documents is not an admission that any of the foregoing is pertinent prior art, nor does it constitute any admission as to the contents or date of these documents.

Modifications may be made to the foregoing embodiments without departing from the basic aspects of the technology. Although the technology may have been described in substantial detail with reference to one or more specific embodiments, changes may be made to the embodiments specifically disclosed in this application, yet these modifications and improvements are within the scope and spirit of the technology. The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation and use of such terms and expressions do not exclude any equivalents of the features shown and described or portions thereof and various modifications are possible within the scope of the technology claimed. The term "a" or "an" may refer to one of or a plurality of the elements it modifies (e.g., "a reagent" can mean one or more reagents) unless it is contextually clear either one of the elements or more than one of the elements is described. Although the present technology has been specifically disclosed by representative embodiments and optional features, modification and variation of the concepts herein disclosed may be made, and such modifications and variations may be considered within the scope of this technology.

Certain embodiments of the technology are set forth in the claim(s) that follow(s).

What is claimed is:

1. An optical demultiplexing device, comprising:
   at least one continuous linear array of photo detector elements; and
   a demultiplexing assembly which is optically coupled to the array, the demultiplexing assembly comprising multiple optical channels, each optical channel formed from at least one bandpass reflector and at least one optical filter, each bandpass reflector being disposed substantially along an input signal axis of the demultiplexing assembly and each channel configured to transmit an optical signal within a selected wavelength range to an active portion of the array of photo detector elements which is electrically isolated from adjacent active portions of photo detector elements of adjacent channels by one or more grounded photo detector elements.

2. The device of claim 1 wherein the active portion of the array of photo detector elements comprises a single photo detector element.

3. The device of claim 1 wherein the active portion of the array of photo detector elements comprises a plurality of photo detector elements.

4. The device of claim 1 wherein the demultiplexing assembly is less than about 3 inches in overall length.

5. The device of claim 4 wherein the demultiplexing assembly is less than about 2 inches in overall length.

6. The device of claim 1 wherein the array of photo detector elements comprises about 10 photo detector elements to about 100 photo detector elements.

7. The device of claim 1 wherein each bandpass reflector is separated from one or more adjacent bandpass reflector by a distance of less than about 4 mm.

8. The device of claim 1 wherein each active portion of the array is separated from one or more adjacent active portions of the array by a distance of less than about 1 mm.

9. An optical demultiplexing device, comprising:
   at least one continuous linear array of photo detector elements; and
   a demultiplexing assembly which is optically coupled to the array of photo detector elements, the demultiplexing assembly comprising:
   a plurality of optical channels, each optical channel formed from at least one bandpass reflector and at least one bandpass filter which is disposed in an optical filter cavity of a single piece baffle assembly, the optical filter cavity being at least partially bounded by a support baffle disposed over an output surface of the filter and including an output aperture and a filter baffle disposed between the filter cavity and adjacent optical channels.

10. The device of claim 9 wherein a bottom edge of the filter baffles of the optical cavity are disposed against a top surface of the support baffle of the optical cavity.

11. The device of claim 9 wherein the filter baffles extend vertically beyond a top or input surface of the filter disposed within the optical filter cavity adjacent the support baffle.

12. The device of claim 9 wherein the demultiplexing assembly is less than about 3 inches in overall length.

13. The device of claim 9 wherein the demultiplexing assembly is less than about 2 inches in overall length.

14. The device of claim 9 wherein the channel disposed adjacent an input aperture of the demultiplexing assembly includes the largest output aperture of the assembly.

15. The device of claim 9 wherein the band wavelength of each channel increases as a function of increased distance from an input aperture of the demultiplexing assembly to compensate for lower responsivity of the photo detector elements as a function of shorter wavelength.

16. The device of claim 9 wherein the support baffles form a rim around the bottom of the filter cavity with an output aperture in the middle which is disposed adjacent an active portion of the photo detector array.

17. The device of claim 9 further comprising a housing having an interior volume that surrounds the bandpass reflectors, filters and baffle assembly.

18. The device of claim 17 wherein an interior surface of the interior volume of the housing comprises a matt black finish configured to absorb stray light signal.

19. The device of claim 17 wherein the dichroic bandpass reflectors extend transversely completely across the interior volume of the housing.

20. The device of claim 9 wherein each bandpass reflector is separated from one or more adjacent bandpass reflectors by a distance of less than about 4 mm.

21. The device of claim 9 wherein each channel corresponds to a unique active portion of the array separated by inactive portions of the array and the active portions of the array are separated from one or more adjacent active portions by a distance of less than about 1 mm.

22. The device of claim 9 wherein each bandpass reflector is disposed at an angle of about 45 degrees with respect to the input optical axis of the device.

23. A method of demultiplexing and analyzing a light signal, comprising:
- propagating a light signal to a first bandpass reflector of a demultiplexing assembly;
- reflecting a first spectral band of the light signal from the first bandpass reflector and propagating the first spectral band through a first band pass filter of the demultiplexing assembly;
- transmitting the remaining spectra of light not reflected by the first bandpass reflector from the first bandpass reflector to a second bandpass reflector;
- reflecting a second spectral band of the light signal from the second bandpass reflector and propagating the second spectral band through a second band pass filter of the demultiplexing assembly;
- detecting an amplitude of the first spectral band with a first active portion of a continuous linear array of photo detectors which is separated from a second active portion of the linear array by one or more grounded photo detector elements of an inactive portion of the linear array after the first spectral band has passed through the first band pass filter; and
- detecting an amplitude of the second spectral band with (a) the second active portion of the continuous linear array of photo detectors after the second spectral band has passed through the second band pass filter.

24. The method of claim 23 further comprising analyzing the amplitude of the first spectral band and second spectral band to obtain an analytical result.

25. The method of claim 23 further comprising passing a light beam through a material sample to generate the light signal.

26. The method of claim 23 wherein the first spectral band propagates from the first bandpass reflector to an input surface of the first band pass filter over a distance of less than about 4 mm.

27. The method of claim 23 wherein the second spectral band propagates from the second bandpass reflector to an input surface of the second band pass filter over a distance of less than about 4.5 mm.

28. The method of claim 23 wherein light propagates from the first band pass reflector to the second band pass reflector over a distance of less than about 4 mm.

29. An optical demultiplexing device, comprising:
- at least one continuous linear array of photo detector elements; and
- a demultiplexing assembly which is optically coupled to the array, the demultiplexing assembly comprising multiple optical channels, each channel configured to transmit an optical signal within a selected wavelength range to an active portion of the array of photo detector elements which is electrically isolated from adjacent active portions of photo detector elements of adjacent channels by one or more grounded photodetector elements.

* * * * *

UNITED STATES PATENT AND TRADEMARK OFFICE
CERTIFICATE OF CORRECTION

| | | |
|---|---|---|
| PATENT NO. | : 9,040,914 B2 | Page 1 of 1 |
| APPLICATION NO. | : 14/105610 | |
| DATED | : May 26, 2015 | |
| INVENTOR(S) | : Jamie Knapp | |

It is certified that error appears in the above-identified patent and that said Letters Patent is hereby corrected as shown below:

In the claims,
    Column 19
        Claim 23, line 26 should read:
            "detecting an amplitude of the second spectral band with ~~(a)~~"

Signed and Sealed this
Twenty-third Day of February, 2016

Michelle K. Lee
*Director of the United States Patent and Trademark Office*